United States Patent
Joyner et al.

(10) Patent No.: US 8,280,255 B2
(45) Date of Patent: Oct. 2, 2012

(54) TRANSMITTER PHOTONIC INTEGRATED CIRCUIT

(75) Inventors: Charles H. Joyner, Sunnyvale, CA (US); Radhakrishnan L. Nagarajan, Cupertino, CA (US); Peter W. Evans, Mountain House, CA (US)

(73) Assignee: Infinera Corporation, Sunnyvale, CA (US)

( * ) Notice: Subject to any disclaimer, the term of this patent is extended or adjusted under 35 U.S.C. 154(b) by 463 days.

(21) Appl. No.: 12/646,942

(22) Filed: Dec. 23, 2009

(65) Prior Publication Data

US 2011/0150471 A1 Jun. 23, 2011

(51) Int. Cl.
*H04J 14/02* (2006.01)
(52) U.S. Cl. ........... 398/79; 398/82; 398/43; 398/152
(58) Field of Classification Search ............ 398/79, 398/82, 84, 87, 43, 152, 183, 186
See application file for complete search history.

(56) References Cited

U.S. PATENT DOCUMENTS

| | | | | |
|---|---|---|---|---|
| 6,985,648 B2* | 1/2006 | Kish et al. | ......... | 385/14 |
| 7,634,195 B2* | 12/2009 | Singh et al. | ......... | 398/79 |
| 7,636,522 B2* | 12/2009 | Nagarajan et al. | ......... | 398/79 |
| 2001/0015837 A1* | 8/2001 | Hung | ......... | 359/124 |
| 2009/0022495 A1* | 1/2009 | Welch et al. | ......... | 398/79 |
| 2010/0046950 A1* | 2/2010 | Cao et al. | ......... | 398/79 |

* cited by examiner

*Primary Examiner* — M. R. Sedighian
(74) *Attorney, Agent, or Firm* — Ross M. Carothers; David L. Soltz

(57) ABSTRACT

The present invention provides a system, apparatus and method to provide for amplification at various points along one or more optical paths of a photonic integrated circuit. According to various embodiments of the invention, the photonic integrated circuit includes a plurality of optical devices having associated characteristics which may have lead to optical signal degradation. One or more optical amplifiers provided along one or more optical paths of the photonic integrated circuit compensate for such signal degradation, resulting in a highly configurable photonic integrated circuit. The various optical devices of the photonic integrated circuit may be provided on a single substrate.

36 Claims, 8 Drawing Sheets

TRANSMITTER PHOTONIC INTEGRATED CIRCUIT

BACKGROUND OF THE INVENTION

1. Field of the Invention

This invention relates generally to optical telecommunication systems and, more particularly, to transmitters comprising photonic integrated circuits employed in such systems.

2. Description of the Related Art

Wavelength division multiplexed (WDM) optical communication systems are known in which multiple optical signals, each having a different wavelength, are combined onto a single optical fiber. Such systems typically include a laser associated with each wavelength, a modulator configured to modulate the output of the laser, and an optical combiner to combine each of the modulated outputs.

Conventionally, WDM systems have been constructed from discrete components. For example, the lasers, modulators and combiners have be packaged separately and provided on a printed circuit board. More recently, however, many WDM components have been integrated onto a single chip, also referred to a photonic integrated circuit (PIC).

In order to further increase the data rates associated with WDM systems, various modulation formats have been proposed for generating the modulated laser output.

One such modulation format, known as polarization multiplexed differential quadrature phase-shift keying ("Pol Mux DQPSK"), can provide higher data rates than other modulation formats, such as an amplitude modulation format. A transmitter outputting Pol Mux DQPSK signals, however, typically has more components, both active and passive, and greater complexity than an amplitude modulating transmitter. Optical signals propagating through or generated by the various PIC components may be subject to loss, noise, and signal distortion (collectively, "signal degradations"), which increase with increased PIC integration. Moreover, due to processing variations during fabrication of the PIC, signal degradations may not be uniform for each optical signal. For example, certain components on the PIC may induce more loss than others.

What is needed is a photonic integrated circuit having reduced signal degradations.

SUMMARY OF THE INVENTION

The present invention provides a system, apparatus and method to provide for amplification at various points along one or more optical paths of a photonic integrated circuit. According to various embodiments of the invention, a plurality of laser sources are provided on a substrate, each of which provide one of a plurality of optical signals at a respective one of a plurality of wavelengths for propagation along one or more optical paths. A modulator is provided on the substrate along certain ones of the optical paths, and in response to a received one of the plurality of optical signals, provides one or more modulated optical signals. A pair of multiplexers is provided on the substrate, each of which accepts a group of modulated signals and providing one of two multiplexed optical outputs. The multiplexed output of a first multiplexer is provided to a polarization rotator and then combined with the multiplexed output of a second multiplexer at a polarization beam combiner. The output of the polarization beam combiner provided as an output from the photonic integrated circuit. An optical amplifier is provided at one or more locations along one or more optical paths to provide amplification of the optical signal propagating therethrough.

In various embodiments of the invention, the photonic integrated circuit has a substrate, a plurality of amplifiers are provided on the substrate along one or more of the optical paths of the photonic integrated circuit. In some embodiments, one or more of the amplifiers are polarization dependent, the optical polarization of the one or more amplifiers being substantially compatible with the optical polarization of an optical signal provided by a laser source coupled to the one or more amplifiers through an optical path. In other embodiments the amplifiers are positioned along the optical paths in order to allow for power balancing with respect to the plurality of optical signals propagating down the various optical paths. In yet other embodiments, the plurality of optical amplifiers provide for power flattening across a plurality of optical signals propagating down each of the plurality of optical paths. In still some embodiments, the amplifiers are semiconductor optical amplifiers.

Other objects, features and advantages of the invention will be apparent from the drawings, and from the detailed description that follows below.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments. In the drawings wherein like reference symbols refer to like parts.

DETAILED DESCRIPTION OF THE INVENTION

The present invention provides a system, apparatus and method to provide for amplification at various points along one or more optical paths of a photonic integrated circuit. According to various embodiments of the invention, a plurality of laser sources are provided on a substrate, each of which provides one of a plurality of optical signals at a respective one of a plurality of wavelengths for propagation along one or more optical paths. A plurality of modulators is provided on the substrate along certain ones of the optical paths to receive the plurality of optical signals and provide modulated optical signals. A first multiplexer may be provided on the substrate which accepts a first group of modulated optical signals and a second multiplexer may be provided on the substrate which accepts a second group of modulated optical signals, each of the first and second multiplexers providing a multiplexed optical output. The multiplexed output of the first multiplexer may be provided to a polarization rotator and then combined with the multiplexed output of the second multiplexer at a polarization beam combiner. The optical signals output of the polarization beam combiner may then be output from the photonic integrated circuit. An optical amplifier may be provided at one or more locations along one or more optical paths to provide amplification of the optical signal propagating therethrough and thus reduce signal degradations.

The following description is set forth for purpose of explanation in order to provide an understanding of the invention. However, it is apparent that one skilled in the art will recognize that embodiments of the present invention, some of which are described below, may be incorporated into a number of different systems and devices.

The embodiments of the present invention may include certain aspects each of which may be present in hardware, software or firmware. Structures and devices shown below in block diagram are illustrative of exemplary embodiments of the invention and are meant to avoid obscuring the invention. Furthermore, connections between components within the figures are not intended to be limited to direct connections. Rather, data between these components may be modified, re-formatted or otherwise changed by intermediary components.

Figure 1:
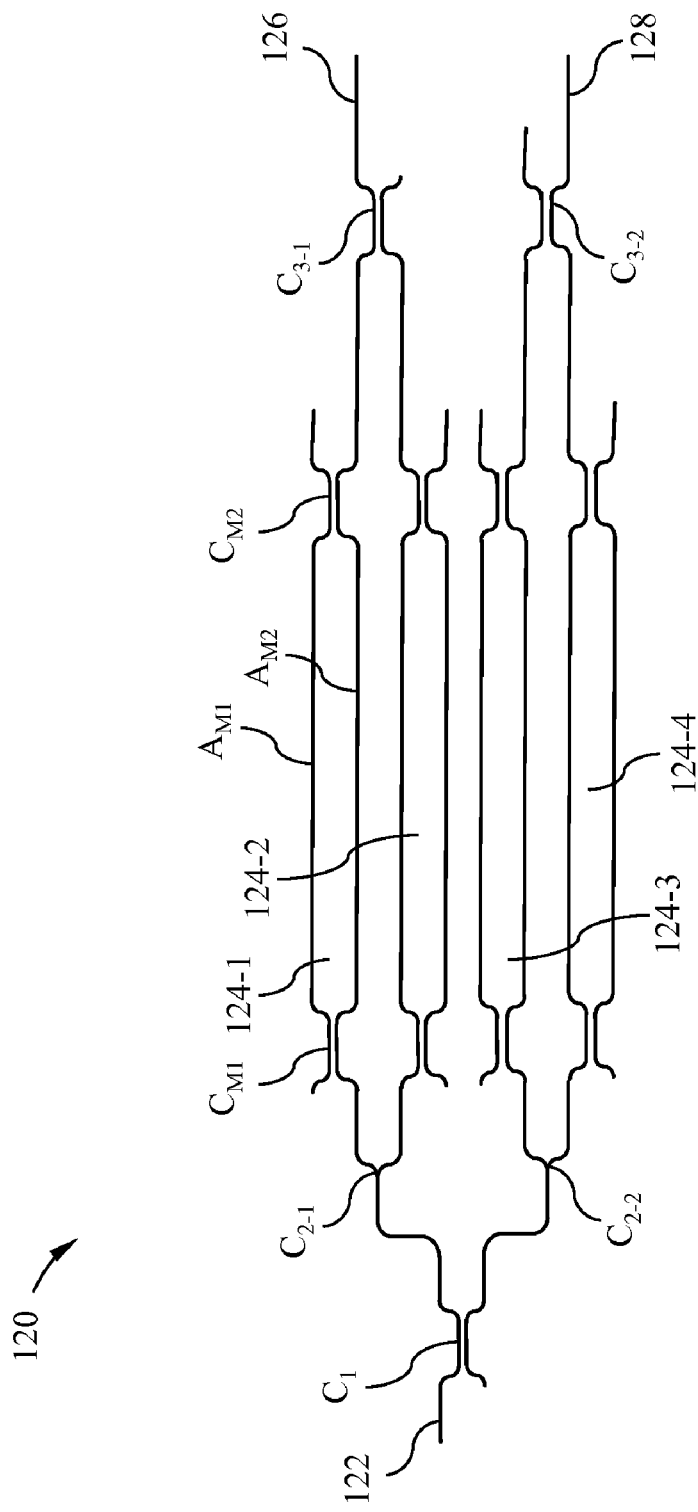
FIG. 1 is a schematic diagram of an exemplary modulator system, according to certain aspects of the invention.

FIG. 1 illustrates an exemplary modulator system 120 in accordance with certain aspects of the present invention. Modulator system 120 may be utilized to encode data in a polarization multiplexed differential quadrature phase-shift keying (PM-DQPSK) format. Generally, modulator system 120 receives an optical signal along an optical path 122, from an optical source for example, and modulates the optical signal through the use of a plurality of modulators 124, which collectively may constitute a "modulator". The optical source can be any suitable optical source such as, for example, a distributed Bragg reflector (DBR) laser source or a distributed feedback (DFB) laser source. Preferably, the optical source is provided on the same substrate as the modulator system 120. As is discussed in greater detail below, a first pair of the plurality of modulators 124-1, 124-2 provides a first modulated output signal along optical path 126 and a second pair of the plurality of modulators 124-3, 124-4 provides a second modulated output signal along optical path 128. As shown in FIG. 1, for example, the optical path 122 and the optical path 126 are optically coupled and, therefore, may be referred herein as being along the same optical path, e.g. optical path 126. Similarly, the optical path 122 and the optical path 128 may be considered as being along the same optical path, as well, e.g. optical path 128.

Optical path 126 includes a series of interconnected optical couplers, denoted $C_1$, $C_{2-1}$, and $C_{3-1}$, and the pair of modulators 124-1, 124-2. The optical signal propagating along optical path 122 from a laser source is coupled via the optical coupler $C_1$ to optical path 126, such that a portion of the received optical signal continues to travel along optical path 126 and a portion of the received optical signal travels along optical path 128. The optical signal is then split in the optical beam splitter or coupler $C_{2-1}$, a portion of the optical signal directed to the modulator 124-1, and a portion of the optical signal directed to modulator 124-2.

Each optical modulators 124-1 and 124-2 is preferably a Mach-Zehnder optical modulator and includes a first and second optical coupler $C_{M1}$, $C_{M2}$ and first and second arms $A_{M1}$, $A_{M2}$. The propagating optical signal received from the splitter $C_{2-1}$ is coupled to each of the first and second arms $A_{M1}$, $A_{M2}$ by the first coupler $C_{M1}$. Through application of an electric field along one of the arms, arm $A_{M1}$ for example, the optical signals interfere constructively or destructively at the second combiner $C_{M2}$, thus allowing the optical signal to pass or be effectively blocked, respectively. A changing electric field along the arm $A_{M1}$ corresponds to a desired data bit pattern encoded by the modulator 124-1. The output of the modulator 124-1 and the output of the modulator 124-2 are coupled into the optical path 126 by an optical coupler $C_{3-1}$, then provided to further structures as defined and described herein. Modulators 124-3 and 124-4 are constructed in similar fashion as modulators 124-1 and 124-2, described above, providing an output optical signal coupled to optical path 128 via the optical coupler $C_{3-2}$.

Modulators 124-1 to 124-4 may be operated in a known manner to output an optical signal that is modulated in accordance with a DQPSK format. Light pulses have primary and orthogonal polarization states or modes referred to as the Transverse Electric (TE) and Transverse Magnetic (TM) modes. The TM component may be thought of as propagating perpendicular to an axis of the optical waveguide and the TE polarization mode may be thought of as propagating parallel to the axis of the optical waveguide. A first modulated data as part of the first modulator output coupled to optical path 126 and a second modulated data as part of the second modulator output coupled to optical path 128 may be of a similar polarization mode, for example the TE mode. A polarization rotator can be used, as discussed in detail below, to rotate the polarization of the optical signals output from modulators 124-3 and 124-4 relative to the polarization of the optical signals output from modulators 124-1 and 124-2. An exemplary modulator system is described in U.S. patent application Ser. No. 12/345,315, filed Dec. 29, 2008, entitled "HIGH CAPACITY TRANSMITTER IMPLEMENTED ON A PHOTONIC INTEGRATED CIRCUIT", incorporated by reference herein in its entirety.

Thus, the optical modulator system 120 accepts an optical input on the path 122 and provides two optical outputs, a first optical output on the optical path 226 and a second optical output on the optical path 228. The first and second optical outputs carry first and second bit patterns, respectively. Preferably, modulator system 120 is one of a plurality of such modulator systems that may be provided on photonic integrated circuit (PIC), and each such modulator system supplies corresponding pairs of bit patterns for transmission from the PIC.

Figure 2:
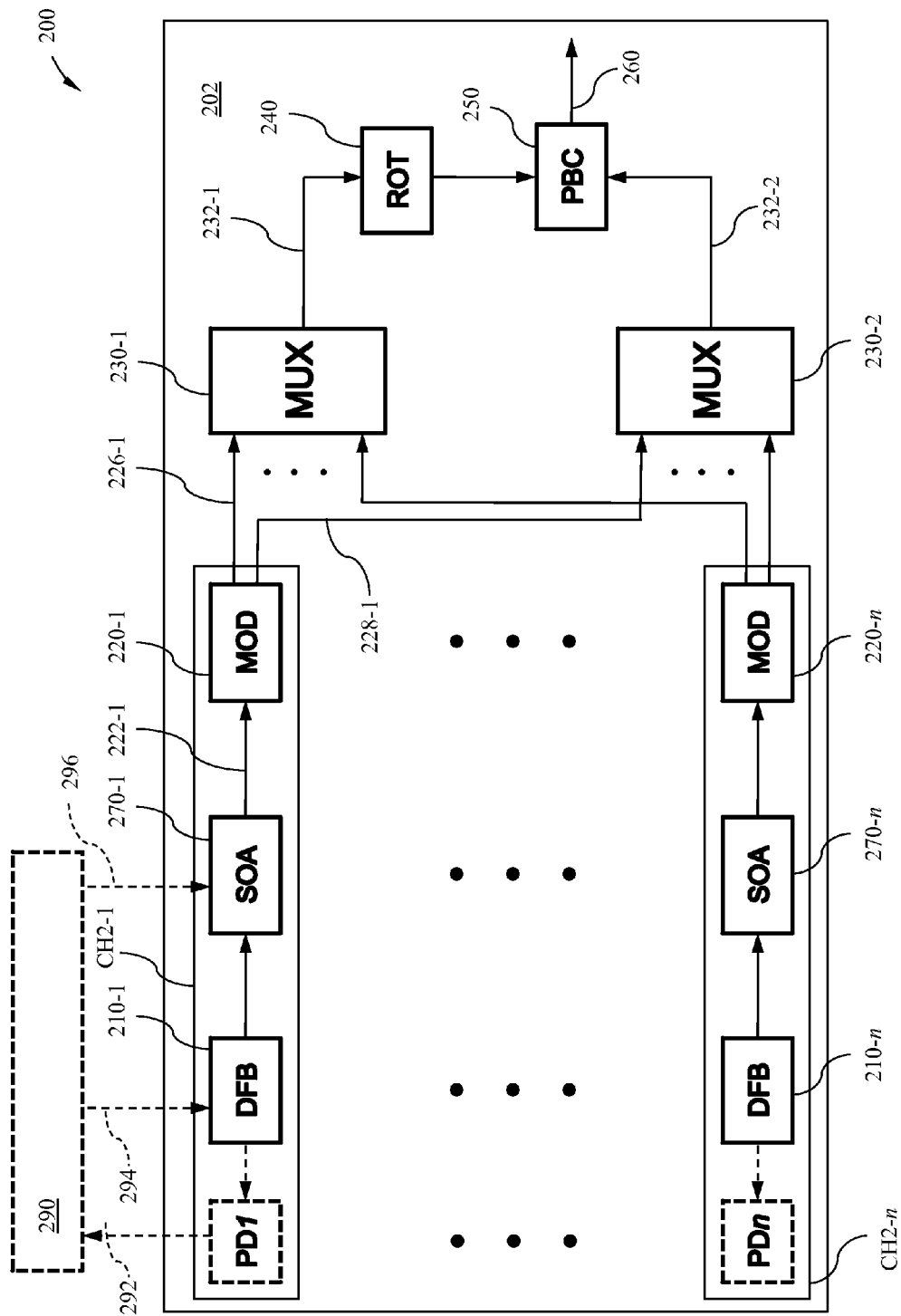
FIG. 2 is a block diagram of a first photonic integrated circuit, according to certain aspects of the invention.

Now turning to FIG. 2, a block diagram of a first photonic integrated circuit 200, according to certain aspects of the invention is depicted. While preferably provided on a single substrate 202, photonic integrated circuit 200 may comprise separate portions, each portion provided on a separate substrate. For more information regarding the fabrication of the photonic integrated circuit 200, or the individual components therein, as well as other photonic integrated circuits described herein, see U.S. Pat. No. 7,283,694, entitled "TRANSMITTER PHOTONIC INTEGRATED CCIRCUITS (TXPIC) AND OPTICAL TRANSPORT NETWORKS EMPLOYING TXPICS," which is incorporated herein by reference in its entirety.

Photonic integrated circuit 200 includes optical channels 1-$n$, e.g. channel 1 is referred to as CH2-1, and channel n is referred to as CH2-$n$, first (230-1) and second (230-2) optical multiplexers, a polarization rotator 240, and a polarization beam combiner 250. Optical channels 1-$n$ may be referred herein also signal channels 1-$n$. Optical channel CH2-1 includes a laser source 210-1, a semiconductor optical amplifier (SOA) 270-1, and a modulator 220-1, the modulator 220-1 being similar to the modulator system 120 of FIG. 1.

In operation, considering optical channel CH2-1, the laser source 210-1, for example distributed feedback (DFB) laser source 210-1, provides a first optical output at a first of a plurality of wavelengths to the semiconductor optical amplifier 270-1, which then provides an amplified optical signal to the optical modulator 220-1. Similar to optical modulator system or optical modulator 120, optical modulator 220-1 receives the first optical output of the laser source 210-1 as an input 222-1 and provides a first modulated output 226-1 and a second modulated output 228-1. The first and second modulated outputs each carry a bit pattern to be transmitted over a network infrastructure, in the form of a PM-DQPSK signal for example. The first modulated output signal 226-1 is provided to one of a plurality of inputs of the first multiplexer 230-1, and the second modulated output signal 228-1 is provided to one of a plurality of inputs of the second multiplexer 230-2. In this way, the first multiplexer 230-1 combines the first modulated output signal 226-$n$ of each of the channels n to form a first combined output signal 232-1, and the second multiplexer 230-2 combines the second modulated output signal 228-$n$ of each of the channels n to form a second combined output signal 232-2. The laser sources 210-$n$, SOAs 270-$n$, modulators 220-$n$ and the multiplexers 230-1, 230-2, as well as the optical waveguides which provide interconnection between these devices, are generally considered single polarization devices, which the optical signal with a primary or single polarization. So as not to destructively interfere with each other, one combined signal 232 must be rotated, providing the polarization beam combiner 250 with one combined signal 232 of a first polarization and another combined signal 232 of a second polarization. As depicted in FIG. 2, the first combined signal 232-1 is provided to the polarization rotator 240, the output of which is then provided to the polarization beam combiner 250. The second combined signal 232-2 is also provided to the polarization beam combiner 250, which then combines the first and second combined signals 232-1, 232-2 into an output signal 260. Alternatively, as should be readily apparent, polarization rotator 240 may be positioned to receive and rotate the second combined signal 232-2, providing the second combined signal 232-2 as a first input to the polarization beam coupler 250, the remaining input of the polarization beam coupler 250 provided by the first combined signal 232-1.

Optionally, each of optical channels CH2-1 through CH2-$n$ can further include a photodiode PD, designated PD1 for channel CH2-1 for example, for diagnostic or control purposes, the photodiode PD1, as well as the interconnecting waveguide with the laser source 210-1, depicted in dashed-line. For example, the photodiode PD1 can be used to obtain and provide characteristics related to the laser source 210-1, or any other laser source 210-1 through 210-$n$, to an optional control system 209. A portion of the optical signal received from the laser source 210-1 is obtained by the photodiode PD1 and converted into a corresponding electrical signal 292, representative of certain characteristics of the laser source, such as optical power or optical frequency, which is provided to the control system 209. The characteristics may be used by the control system 209 to provide a desired bias signal 294 to the laser source 210-1 in order to maintain the output power of the laser source 210-1 at a desired power level, for example. Additionally, the characteristics may be used by the control system 209 to provide a desired control signal to a heater (not shown) in thermal contact with the laser source 210-1 to maintain the frequency of the optical output of the laser source 210-1 at a desired value. Also, the characteristics may be used by the control system 209 to provide a desired signal to the SOA 270-1 to amplify the optical signal received from the laser source 210-1 such that a desired optical power is maintained at the output of the SOA 270-1. Similarly, a control system similar to control system 209 may be used in connection with other photonic integrated circuits disclosed or contemplated herein. Such a control system as part of a photonic integrated circuit discussed or contemplated herein, for example as discussed above with control system 209 of the embodiment of FIG. 1, may receive a portion of an optical signal at one or more locations within the associated photonic integrated circuit, the corresponding signals used by the control system to control various optical elements, such as laser sources or SOAs as part of the photonic integrated circuit. More information regarding such control systems can be found in U.S. Pat. No. 7,283,694, supra.

With the SOA 270-1 positioned within each signal channel n, amplification across each of the two polarizations on the output signal 260 per wavelength is achieved. Additionally, positioning each SOA 270-$n$ within each signal channel CH2-1 through CH2-$n$ allows for tuning of the optical power across the wavelength spectrum of the signal channels n. In such a case, each of the SOAs 270-$n$ of each of the signal channels n can provide amplification such that the optical output, e.g. the optical signal provided on input 222-$n$ to the corresponding optical modulator 220-$n$, has the same power level, thus providing power flattening across the frequency spectrum of the signal channels n. Alternatively, each SOA 270-$n$ can provide amplification such that the optical output power over the wavelength spectrum is different for at least two of the signal channels CH2-1 through CH2-$n$, a first of the signal channels having a first output power and a second of the signal channels having a second output power. In this way, the output of each signal channel CH2-1 through CH2-$n$ can be specifically tailored to achieve a desired output, as part of the output signal 260.

Figure 3:
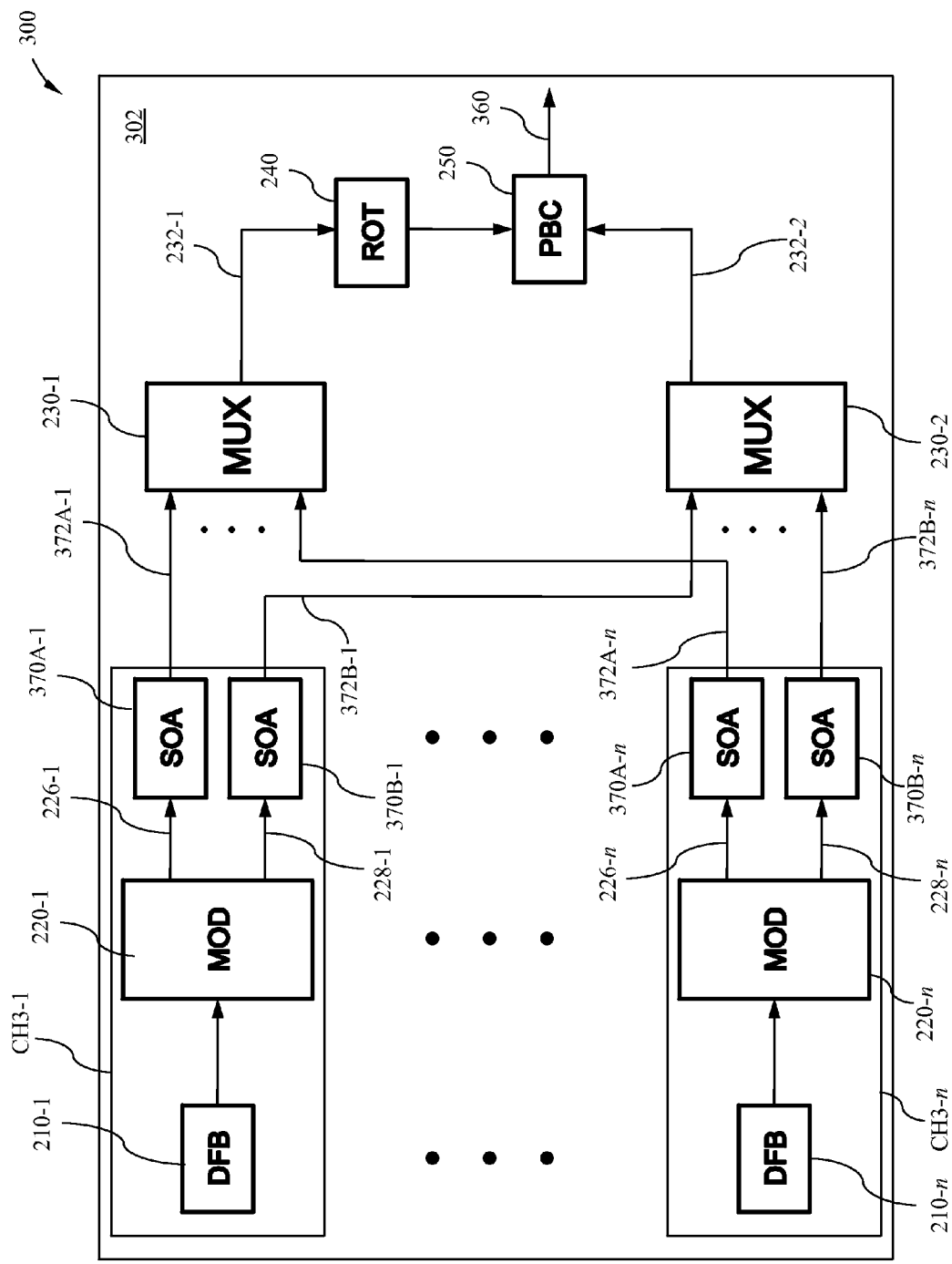
FIG. 3 is a block diagram of a second photonic integrated circuit, according to certain aspects of the invention.

Now turning to FIG. 3, a block diagram of a second photonic integrated circuit 300, according to certain aspects of the invention is depicted. As with photonic integrate circuit 200, photonic integrated circuit 300 is preferably provided on a single substrate 302. Photonic integrated circuit 300 is similar to photonic integrated circuit 200, however photonic integrated circuit 300 does not include an SOA, e.g. SOA 270-1 through 270-$n$, between the laser source 210 and the optical modulator 220. Rather, photonic integrated circuit 300 comprises a pair of SOAs 370A, 370B per each signal channel n, e.g. signal channels CH3-1 through CH3-$n$. With reference to optical channel CH3-1, the first modulated output 226-1 is provided to a first SOA 370A-1, and the second modulated output 228-1 is provided to a second SOA 370B-1. The SOA 370A-1 provides an amplified first modulated output 372A-1 to a first of the plurality of inputs to the first multiplexer 230-1, while the SOA 370B-1 provides an amplified second modulated output 372B-1 to a first of the plurality of inputs of the second multiplexer 230-2. In a manner similar as discussed above in regard to photonic integrated circuit 200, an output signal 360 is generated. Such a configuration provides for enhanced power control and power balancing between polarizations for each wavelength within the wavelength spectrum of the signal channels CH3-1 through CH3-$n$, as compared to the embodiment of FIG. 2. For example, a portion of the output signal 360 corresponding to first multiplexed output 372A-1 can be set at a desired power level with respect to a portion of the output signal 360 corresponding to the second multiplexed output 372B-1. Additionally, the overall power of the signal channels CH3-1 through CH3-$n$ across the wavelength spectrum can be controlled by individual control over the power level of each of the signal channels CH3-1 through CH3-$n$ per polarization. This allows for more precise control of the overall output power of the output signal 360, for overcoming shot noise and, thus, maintaining a relatively high optical signal-to-noise ratio for example.

Figure 4:
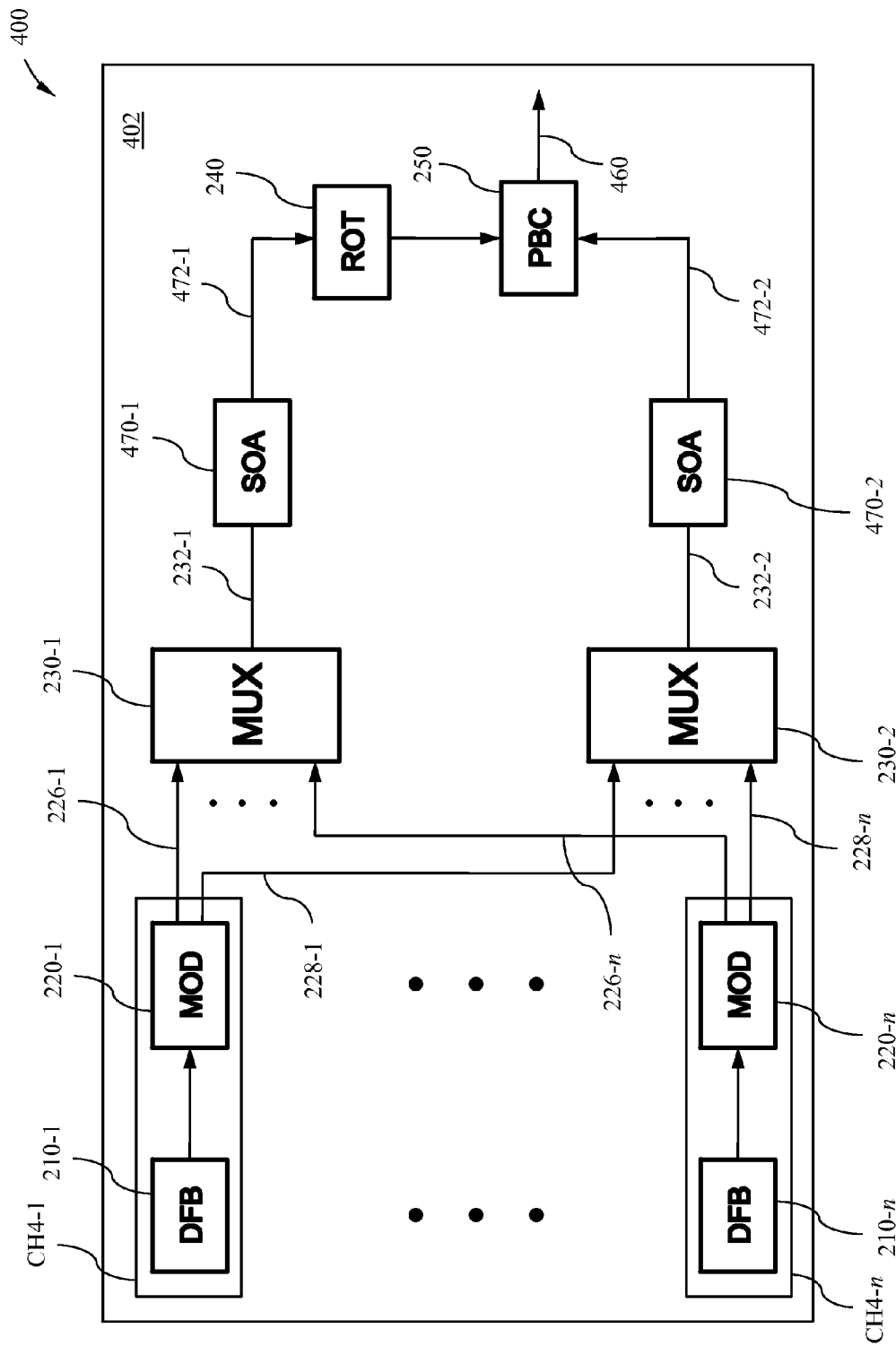
FIG. 4 is a block diagram of a third photonic integrated circuit, according to certain aspects of the invention.

Now turning to FIG. 4, a block diagram of a third photonic integrated circuit 400, according to certain aspects of the invention is depicted. As with photonic integrate circuit 200, photonic integrated circuit 400 is preferably provided on a single substrate 402. Photonic integrated circuit 400 is similar to photonic integrated circuit 200, however photonic integrated circuit 400 does not include an SOA, e.g. SOAs 270, between the laser source 210 and the optical modulator 220. Rather, photonic integrated circuit 400 comprises a first SOA 470-1 which accepts the first multiplexed output 232-1 from the first multiplexer 230-1, and a second SOA 470-2 which accepts the second multiplexed output 232-2 from the second multiplexer 230-2. In response to receiving the first multiplexed output 232-1, the first SOA 470-1 provides an amplified multiplexed signal 472-1 to the polarization rotator 240, which provides a first signal having a first polarization to polarization beam combiner 250. The second SOA 470-2 provides an amplified multiplexed signal 472-2 having a second polarization to polarization beam combiner 240 which combines the first and second signals into an output signal 460.

The configuration of photonic integrated circuit 400 of FIG. 4, with amplification provided to the output signal 472 of each multiplexer 230, provides for more efficient power control since the power is applied over the optical channel group, e.g. over n signal channels, for each polarization. For example, the power of the first multiplexed output 232-1 can be matched to the second multiplexed output 232-2 prior to being combined in the combiner 250. Alternatively, each of the power levels of the first multiplexed output 232-1 and the second multiplexed output 232-2 can be adjusted to a desired value prior to being combined by the combiner 250 in order to compensate for losses observed at each of the outputs 232, as part of the output signal 460, as the outputs 232 propagate through the photonic integrated circuit 400. In such cases, the desired power value of the first multiplexed output 232-1 may be different from the desired power value of the second multiplexed output 232-2. In this way, SOAs 470 allow for precise output power, per polarization, as seen at the output signal 460 or from a facet of the photonic integrated circuit 400.

SOAs 470, as positioned within photonic integrated circuit 400, provide additional advantages as well. SOAs 470 can also be used to correct for losses due to component aging per optical channel group. For example, aging of the first multiplexer 230-1 may result in a corresponding power loss as the plurality of optical signals 226-n propagate through the multiplexer 230-1. SOA 470-1 can then be used to compensate for the losses of multiplexer 230-1. A circuit can provide a feedback control function to monitor the optical power at one or more points along an optical path of the photonic integrated circuit and drive the SOAs 470 to compensate for any losses observed over time in the corresponding optical channel group. In this way, the first amplified output 472-1 can be maintained at a desired power relative to the second amplified output 472-2. In general, SOAs 470 can compensate for a lossy integrated element, or elements which provide a desired function, in an optical path coupled to the SOAs 470, whether part of the photonic integrated circuit 400, or located external to the circuit 400, in order to limit shot noise and maintain a desired optical signal-to-noise ratio.

Figure 5:
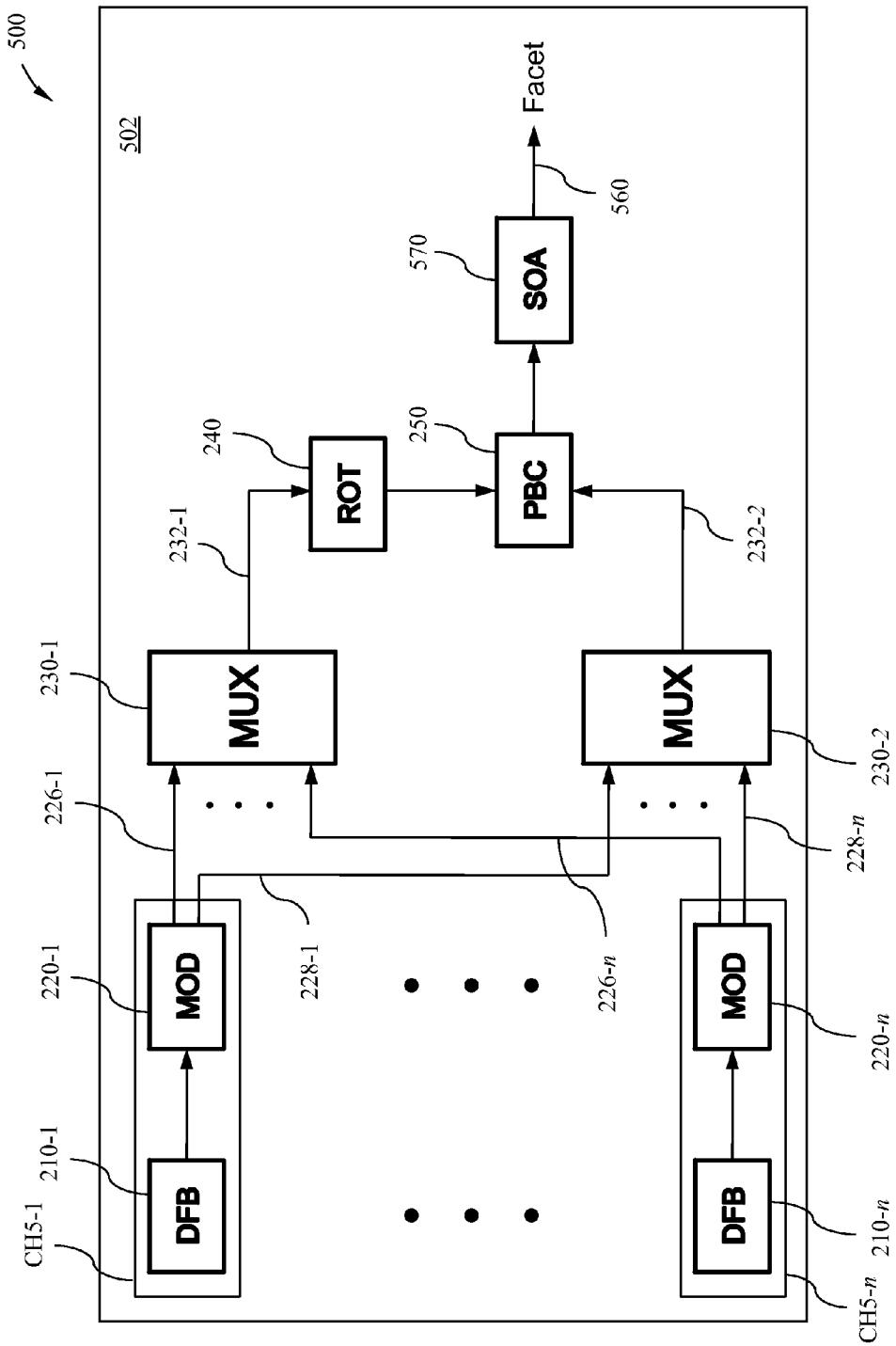
FIG. 5 is a block diagram of a fourth photonic integrated circuit, according to certain aspects of the invention.

Now turning to FIG. 5, a block diagram of a fourth photonic integrated circuit 500, according to certain aspects of the invention is depicted. As with photonic integrate circuit 200, photonic integrated circuit 500 is preferably provided on a single substrate 502. Photonic integrated circuit 500 is similar to photonic integrated circuit 200, however photonic integrated circuit 500 does not include an SOA, e.g. SOAs 270, between the laser source 210 and the optical modulator 220. Rather, photonic integrated circuit 500 comprises an SOA 570 which accepts the combined output optical signal from the polarization beam combiner 250 and provides an amplified output signal 572, which then becomes the output signal 560 of photonic integrated circuit 500. Output signal 560 is output through a facet of photonic integrated circuit 500. SOA 570 provides for power control over the combined polarization signal, compensating for losses which impact each polarization equally, e.g. first and second multiplexed signals 232. A number of photonic integrated circuits 500-n can be combined to form a large scale transmitter. With respect to the resulting large scale transmitter, the power of a first output signal 560-1 from a first such photonic integrate circuit 500-1 can be adjusted with respect to a second output signal 560-2 from a second such photonic integrated circuit 500-2 to provide a desired power equalization or power having a desired tilt across all the output signals 560-n.

Figure 6:
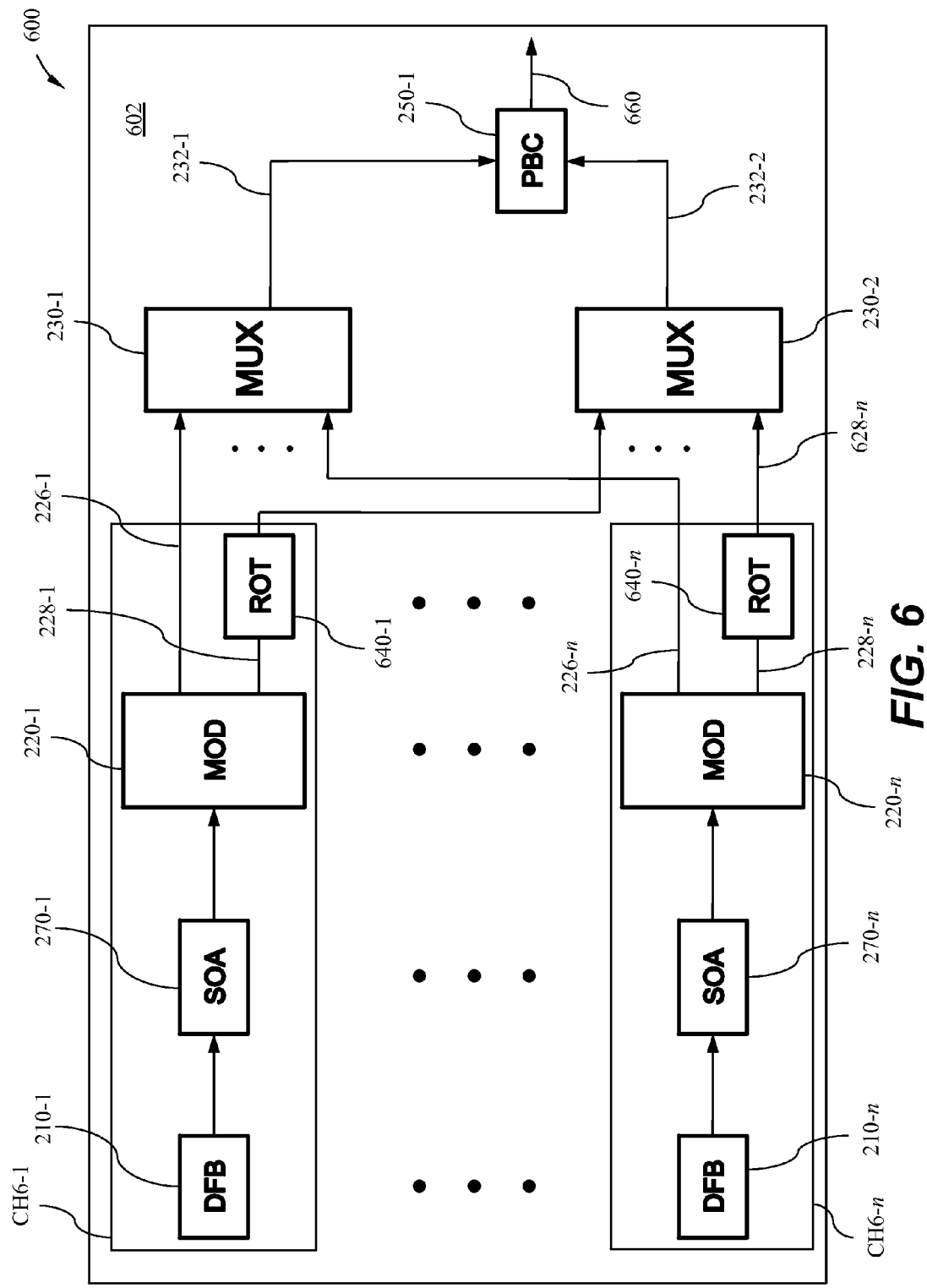
FIG. 6 is a block diagram of an alternative embodiment of the photonic integrated circuit of FIG. 2.

Now turning to FIG. 6, a block diagram of another photonic integrated circuit 600, according to certain aspects of the invention is depicted. As with photonic integrate circuit 200, photonic integrated circuit 600 is preferably provided on a single substrate 602. Photonic integrated circuit 600 is similar to photonic integrated circuit 200, however photonic integrated circuit 600 does not include the polarization rotator 240. Rather, photonic integrated circuit 600 comprises a plurality of polarization rotators 640-1 through 640-n as part of each signal channel CH6-1 through CH6-n. With reference to optical channel CH6-1, the second modulated output 228-1 of the modulator 220-1 is provided to a polarization rotator 640-1. Therefore, the first multiplexer 230-1 receives a first plurality of modulated signals 226-1 through 226-n from each of the corresponding optical channels 1-n, and the second multiplexer 230-2 receives a second plurality of modulated output signals 628-1 through 628-n from each of the corresponding optical channels CH6-1 through CH6-n. The first plurality of optical signals being of a first polarization, while the second plurality of optical signals are of a second polarization. Similar to what is described above with respect to the embodiment of FIG. 2, the first multiplexer 230-1 combines the first plurality of modulated signals 226-1 into the output signal 232-1 which is provided at the first input of the polarization beam combiner 250-1. The second multiplexer 230-2 combines the second plurality of modulated signals 628-1 into the output signal 232-2 which is provided at the second input of the polarization beam combiner 250-1. The polarization beam combiner then combines the first 232-1 and the second 232-2 output signals into an output signal 660. While the polarization rotators 640-1 through 640-n are depicted as accepting the second multiplexed output signal 228-1, it should be readily apparent that each of the rotators 640-1 through 640-n can be alternatively positioned to accept the first multiplexed output signal 226-1. The rotators 640-1 through 640-n would then provide a polarization rotated first multiplexed signal to the first multiplexer 230-1.

In the embodiment of FIG. 6, with the SOA 270-1 positioned within each signal channel CH6-1 through CH6-n, amplification across each of the two polarizations on the output signal 260 per wavelength is achieved. Additionally, positioning each SOA 270-n within each signal channel CH6-1 through CH6-n allows for tuning of the optical power across the wavelength spectrum of the signal channels n. In such a case, each of the SOAs 270-n of each of the signal channels n can provide amplification such that the optical output, e.g. the optical signal provided on input 222-*n* to the corresponding optical modulator 220-*n*, has the same power level, thus providing power flattening across the frequency spectrum of the signal channels n. Alternatively, each SOA 270-*n* can provide amplification such that the optical output power over the wavelength spectrum is different for at least two of the signal channels CH6-1 through CH6-*n*, a first of the signal channels having a first output power and a second of the signal channels having a second output power. In this way, the output of each signal channel n can be specifically tailored to achieve a desired output, as part of the output signal 660.

Figure 7:
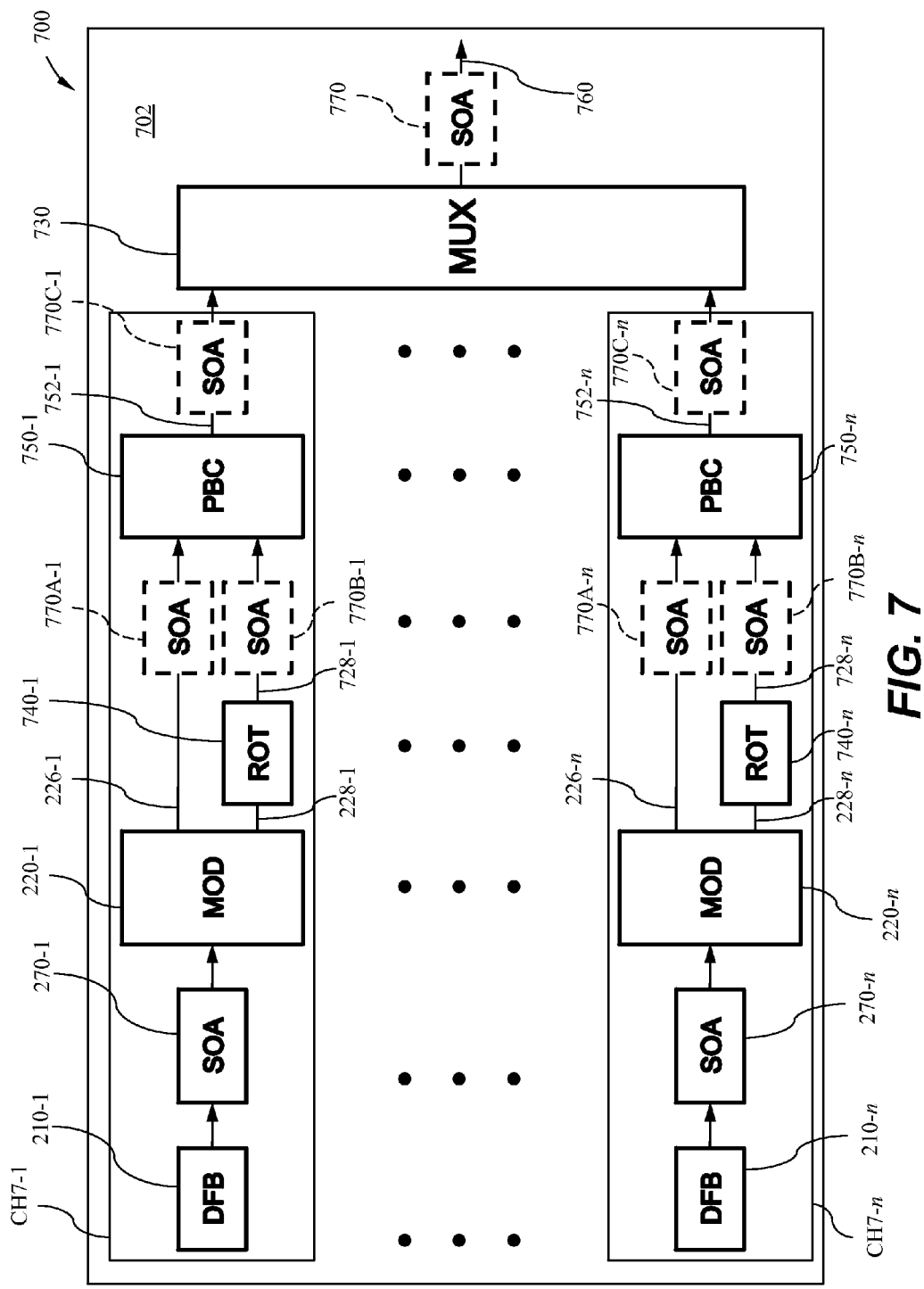
FIG. 7 is a block diagram of another photonic integrated circuit, according to certain aspects of the invention.

Now turning to FIG. 7, a block diagram of another photonic integrated circuit 700, according to certain aspects of the invention is depicted. As with photonic integrate circuit 200, photonic integrated circuit 700 is preferably provided on a single substrate 702. Photonic integrated circuit 700 includes a plurality of signal channels CH7-1 through CH7-*n* similar to photonic integrated circuit 200, however photonic integrated circuit 700 does not include first 230-1 and second 230-2 multiplexers. Rather, photonic integrated circuit 700 comprises a single multiplexer 730. With specific reference to optical signal channel CH7-1, each of the signal channels CH7-1 through CH7-*n*, includes the laser source 210-1, the SOA 270-1, and the modulator 220-1, similar to the exemplary embodiment of FIG. 2. However, each signal channel CH7-1 through CH7-*n* also includes a polarization rotator 740-1 and a polarization beam combiner 750-1. With reference to optical channel CH7-1, the first modulated output 226-1 from the modulator 22-1 is provided to a first input of the polarization beam combiner 750-1. The second modulated output 228-1 of the modulator 220-1 is provided to a polarization rotator 740-1, which then provides a rotated modulated output signal 728-1 to a second input of the polarization beam combiner 750-1. The polarization beam combiner 750-1 combines the rotated modulated output signal 728-1 with the first modulated output signal 226-1 and provides a first combined output signal 752-1 to a first of a plurality of inputs of the multiplexer 730. The multiplexer 730 combines all of the combined output signals, e.g. combined output signals 752-1 through 752-*n*, into a multiplexed output signal 760.

In the embodiment of FIG. 7, with the SOA 270-1 positioned within each signal channel n, amplification across each of the two polarizations on the output signal 260 per wavelength is achieved. Additionally, positioning each SOA 270-*n* within each signal channel n allows for tuning of the optical power across the wavelength spectrum of the signal channels n. In such a case, each of the SOAs 270-*n* of each of the signal channels n can provide amplification such that the optical output, e.g. the optical signal provided on input 222-*n* to the corresponding optical modulator 220-*n*, has the same power level, thus providing power flattening across the frequency spectrum of the signal channels CH7-1 through CH7-*n*. Alternatively, each SOA 270-*n* can provide amplification such that the optical output power over the wavelength spectrum is different for at least two of the signal channels 1-*n*, a first of the signal channels having a first output power and a second of the signal channels having a second output power. In this way, the output of each signal channel n can be specifically tailored to achieve a desired output, as part of the output signal 760.

As depicted and described with respect to the embodiments of FIGS. 3-6, the various SOAs can be provided at numerous other locations within the photonic integrated circuit. For example, with respect to the photonic integrated circuit 700 of FIG. 7, signal channel CH7-1 can further optionally include a pair of SOAs 770A-1 and 770B-1 depicted in dashed line. The first SOA 770A accepts the first modulated output signal 226-1 and the second SOA accepts the second modulated output signal 728-1. Each of the SOAs 770A-1, 770B-1 provide corresponding amplified outputs to the first and second inputs of the polarization beam combiner 750-1, respectively. Thus, amplification to the optical signals is provided per polarization per wavelength. Alternatively, the SOA 770B-1 can be positioned to accept the second modulated output 228-1 from the modulator 220-1, providing an amplified second modulated output 228-1 to the rotator 740-1. Each signal channel, e.g. signal channels CH7-1 through CH7-*n*, may further optionally include an SOA 770C-1 positioned to accept the combined output signal 752-1 from the polarization beam combiner 750-1, providing amplification of the combined output signal 752-1. Also, photonic integrated circuit 700 may further optionally include an SOA 770 positioned to accept the multiplexed output signal from the multiplexer 730 and provide an amplified multiplexed output signal as output signal 760.

Figure 8:
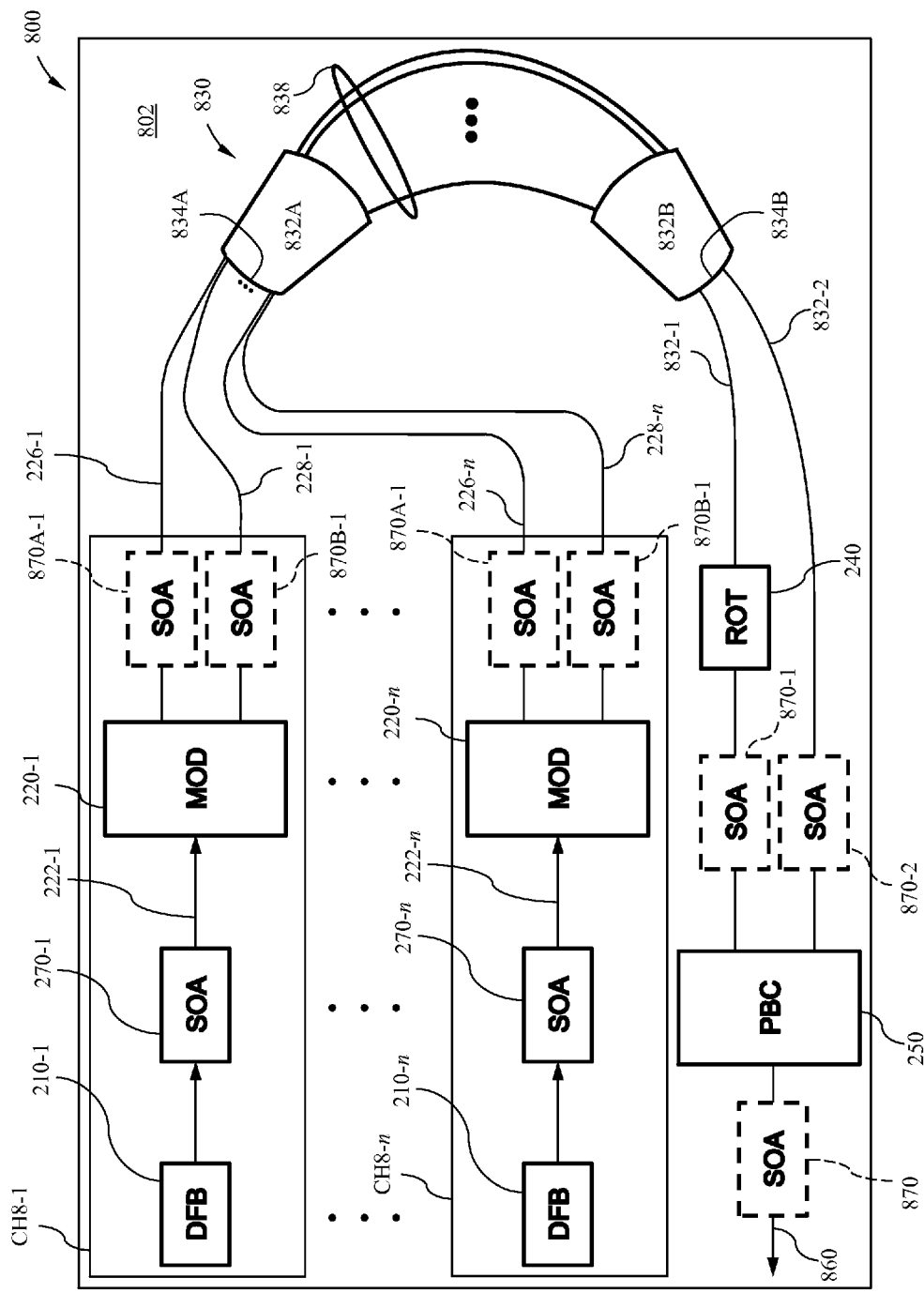
FIG. 8 is a block diagram of yet another photonic integrated circuit, according to certain aspects of the invention.

Now turning to FIG. 8, a block diagram of another photonic integrated circuit 800, according to certain aspects of the invention is depicted. As with photonic integrate circuit 200, photonic integrated circuit 800 is preferably provided on a single substrate 802. Photonic integrated circuit 800 includes a plurality of signal channels CH8-1 through CH8-*n* similar to photonic integrated circuit 200, however photonic integrated circuit 800 does not include first 230-1 and second 230-2 multiplexers. Rather, photonic integrated circuit 800 comprises a single wavelength selective multiplexer 830, e.g. an arrayed wavelength grating. With specific reference to optical signal channel CH7-1, each of the signal channels CH7-1 through CH7-*n*, includes the laser source 210-1, the SOA 270-1, and the modulator 220-1, similar to the exemplary embodiment of FIG. 2. The first 226-1 and second 228-1 modulated outputs are provided to the multiplexer 830. The multiplexer 830 comprises a first slab or free space region 832A and a second slab or free space region 832B with a plurality of waveguides 838 connecting the first free space region 832A to the second free space region 832B. Each of the plurality of waveguides have a different length compared to the remaining ones of the plurality of waveguides 838. The first free space region 832A has a surface 834A which accepts the first 226-1 and the second 228-1 modulated output signals at a first end along the end surface 834A, as shown. The first 226-*n* and the second 228-*n* modulated output signals of CH8-*n* are provided at a second end along the end surface 834A of the multiplexer 830, the remaining first and second modulated output signals from the remaining signal channels CH8-2 through CH8-(*n*–1) provided between the second modulated output signal 228-1 of CH8-1 and the first modulated output signal 226-*n* of CH8-*n*.

Since each of the plurality of waveguides 838 have differing lengths, the multiplexer 830 is adapted to provide a first multiplexed output signal 832-1 along a surface 834B of the second free space region 832B, the first multiplexed output signal 832-1 including each of the first modulated outputs 226-1 through 226-*n*. Similarly, a second multiplexed output signal 832-2 is provided along the surface 834B, the second multiplexed output signal 832-2 including each of the second modulated outputs 228-1 through 228-*n*. The depiction of the waveguides associated with the first and second modulated output signals for each of the signal channels CH8-1 through CH8-*n* is for illustration purposes only. Other waveguide layouts are contemplated herein which limit optical loss, the waveguides limited to a desired radius of curvature to limit optical loss for example.

As shown the first multiplexed signal 832-1 is provided to rotator 240 which, in turn, provides a rotated first multiplexed signal to the first input of the polarization beam combiner 250. The second multiplexed signal 832-2 is provided to the second input of the polarization beam combiner 250. The polarization beam combiner combines the received signals into an output signal 860, provided through a facet as an output of the photonic integrated circuit 800 for example. As should be readily understood, the polarization rotator 240 may be positioned to accept the second multiplexed output 832-2 and provide a rotated second multiplexed output to the second input of the polarization beam combiner 250, the first multiplexed output 832-1 provided from the multiplexer 830 to the first input of the polarization beam combiner 250.

In the embodiment of FIG. 8, as with other embodiments discussed herein, with the SOA 270-1 positioned within each signal channel n, amplification across each of the two polarizations, e.g. both polarizations of each signal channel n, on the output signal 260 per wavelength is achieved. Additionally, positioning each SOA 270-n within each signal channel n allows for tuning of the optical power across the wavelength spectrum of the signal channels n. In such a case, each of the SOAs 270-n of each of the signal channels n can provide amplification such that the optical output, e.g. the optical signal provided on input 222-n to the corresponding optical modulator 220-n, has the same power level, thus providing power flattening across the frequency spectrum of the signal channels CH8-1 through CH8-n. Alternatively, each SOA 270-n can provide amplification such that the optical output power over the wavelength spectrum is different for at least two of the signal channels CH8-1 through CH8-n, a first of the signal channels having a first output power and a second of the signal channels having a second output power. In this way, the output of each signal channel n can be specifically tailored to achieve a desired output, as part of the output signal 860.

As depicted and described with respect to the embodiments of FIGS. 3-6, as well as the embodiment of FIG. 7, the various SOAs can be provided at numerous other locations within the photonic integrated circuit. For example, with respect to the photonic integrated circuit 800 of FIG. 8, signal channel CH8-1 can further optionally include a pair of SOAs 870A-1 and 870B-1 depicted in dashed line. The first SOA 870A accepts the first modulated output signal 226-1 and the second SOA 870B accepts the second modulated output signal 228-1. Each of the SOAs 870A-1, 870B-1 provide corresponding amplified outputs to the first free space region 832A of the multiplexer 830. Thus, amplification to the optical signals is provided per polarization per wavelength.

Each signal channel, e.g. signal channel CH8-1 through CH8-n, may further optionally include a pair of SOAs 870-1, 870-2, as depicted in dashed line. A first of the pair of SOAs 870-1 is positioned to accept the rotated first multiplexed output from the rotator 240 and providing an amplified rotated first multiplexed output to the first input of the polarization beam combiner 250. Such a configuration provides for amplification per polarization per multiplexed output, the first multiplexed output 832-1 including the first modulated outputs 226-1 through 226-n, and the second multiplexed output 832-2 including the second modulated outputs 228-1 through 228-n. Also, photonic integrated circuit 800 may further optionally include an SOA 870 positioned to accept the combined output from the polarization beam combiner 250 and provide an amplified combined output signal as output signal 860.

The exemplary photonic integrated circuits of FIGS. 2-8 are provided for discussion of the related advantages and are not to be deemed limiting. Therefore, as should be apparent to one of ordinary skill in the art, such circuits can include additional elements which have losses or provide an undesirable source of noise which can be remedied through application of one or more semiconductor optical amplifiers properly positioned within the photonic integrated circuit to overcome such losses or signal degradation factors. Such losses can be overcome, as discussed above, relative to a specific wavelength of a signal channel, a specific polarization of a signal channel, a specific polarization of an optical channel group, or an output signal of the photonic integrate circuit itself. Moreover, additional photonic integrated circuits are contemplated herein, such that a photonic integrated circuit may include a plurality of groups of semiconductor optical amplifiers, each of the plurality of groups of semiconductor optical amplifiers providing amplification relative a different level of operation set forth immediately above, thus providing the photonic integrated circuit advantages as discussed and contemplated herein. For example, a first group of semiconductor optical amplifiers may provide amplification relative to the various wavelengths of the signal channels, while a second group of semiconductor optical amplifiers may provide amplification relative to a polarization of each of the signal channels, and a third group of semiconductor optical amplifiers may provide amplification relative to a polarization of an optical channel group.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A photonic integrated circuit comprising:
   a substrate;
   a first and a second laser source provided on the substrate, the first laser source configured to provide a first optical output at a respective one of a plurality of wavelengths, the second laser source configured to provide a second optical output at a respective one of the plurality of wavelengths;
   a first and a second semiconductor optical amplifier (SOA) provided on the substrate, the first SOA coupled to the first laser source to receive the first optical signal and provide a first amplified optical signal, the second SOA coupled to the second laser source to receive the second optical output and provide a second optical signal;
   a first and a second modulator provided on the substrate, the first modulator coupled to the first SOA to receive the first amplified optical signal and provide a first of a plurality of first modulated optical outputs and a first of a plurality of second modulated optical outputs, the second modulator coupled to the second SOA to receive the second of the plurality of amplified optical signals and provide a second of the plurality of first modulated optical outputs and a second of the plurality of second modulated optical outputs;
   a first and a second optical multiplexer provided on the substrate, the first optical multiplexer having a plurality of inputs and an output, the first optical multiplexer configured to receive each of the plurality of first modulated optical outputs on a corresponding one of the plurality of inputs of the first optical multiplexer, the first optical multiplexer configured to multiplex the plurality of first modulated optical outputs into a first multiplexed optical output provided at the output of the first optical multiplexer, the second optical multiplexer having a plurality of inputs and an output, the second optical multiplexer configured to receive each of the plurality of second modulated optical outputs on a corresponding one of the plurality of inputs of the second optical multiplexer, the second optical multiplexer configured to multiplex the plurality of second modulated optical outputs into a second multiplexed optical output provided at the output of the second optical multiplexer.

2. The photonic integrated circuit of claim 1, further comprising a polarization rotator and polarization beam combiner, the polarization rotator coupled to the first multiplexer to receive the first multiplexed optical output and provide a rotated first multiplexed optical output to a first input of the polarization beam combiner, the polarization beam combiner configured to receive the second multiplexed optical output on a second input of the polarization beam combiner, the polarization beam combiner combining the rotated first multiplexed optical output with the second multiplexed optical output into a combined optical output signal provided on an output of the polarization beam combiner.

3. The photonic integrated circuit of claim 1, wherein each of the plurality of modulators comprises a Mach-Zehnder modulator.

4. The photonic integrated circuit of claim 1, wherein each of the laser sources is a DFB laser source or a DBR laser source.

5. The photonic integrated circuit of claim 1, wherein the first optical multiplexer is a first arrayed wavelength grating and the second optical multiplexer is a second arrayed wavelength grating.

6. The photonic integrated circuit of claim 1, wherein the first laser source is further configured to provide a third optical output, the photonic integrated circuit further comprising a first photodiode, the first photodiode configured to receive the third optical output.

7. The photonic integrated circuit of claim 6, wherein the second laser source is further configured to provide a fourth optical output, the photonic integrated circuit further comprising a second photodiode, the second photodiode configured to receive the fourth optical output.

8. The photonic integrated circuit of claim 1, wherein the first and second SOAs are first and second SOAs of a plurality of SOAs, the photonic integrated circuit further including a third, a fourth, a fifth, and a sixth of the plurality of SOAs, the third of the plurality of SOAs coupled to the first modulator and configured to receive the first of the plurality of first modulated optical outputs and provide an amplified first of the plurality of plurality of first modulated optical outputs to the first of the plurality of inputs of the first multiplexer, the fourth of the plurality of SOAs coupled to the first modulator and configured to receive the first of the plurality of second modulated optical outputs and provide an amplified first of the plurality of plurality of second modulated optical outputs to the first of the plurality of inputs of the second multiplexer, the fifth of the plurality of SOAs coupled to the second modulator and configured to receive the first of the plurality of second modulated optical outputs and provide an amplified first of the plurality of plurality of second modulated optical outputs to the second of the plurality of inputs of the first multiplexer, the sixth of the plurality of SOAs coupled to the second modulator and configured to receive the second of the plurality of second modulated optical outputs and provide an amplified second of the plurality of plurality of second modulated optical outputs to the first of the plurality of inputs of the second multiplexer.

9. A photonic integrated circuit comprising:
a substrate;
a first and a second laser source provided on the substrate, the first laser source configured to provide a first optical output at a respective one of a plurality of wavelengths, the second laser source configured to provide a second optical output at a respective one of the plurality of wavelengths;
a first and a second modulator provided on the substrate, the first modulator coupled to the first laser source to receive the first optical output and provide a first of a plurality of first modulated optical outputs and a first of a plurality of second modulated optical outputs, the second modulator coupled to the second laser source to receive the second optical output and provide a second of the plurality of first modulated optical outputs and a second of the plurality of second modulated optical outputs;
a first and a second semiconductor optical amplifier (SOA) provided on the substrate, the first SOA coupled to the first modulator to receive the first of the plurality of first modulated optical outputs and provide a first of a first plurality of amplified optical signals, the second SOA coupled to the first modulator to receive the first of the plurality of second modulated optical outputs and provide a first of a second plurality of amplified optical signals;
a third and a fourth semiconductor optical amplifier (SOA) provided on the substrate, the third SOA coupled to the second modulator to receive the first of the plurality of second modulated optical outputs and provide a second of the first plurality of amplified optical signals, the second SOA coupled to the second modulator to receive the second of the plurality of second modulated optical outputs and provide a second of the second plurality of amplified optical signals;
a first and a second optical multiplexer provided on the substrate, the first optical multiplexer having a plurality of inputs and an output, the first optical multiplexer configured to receive each of the plurality of first amplified optical signals on a corresponding one of the plurality of inputs of the first optical multiplexer, the first optical multiplexer configured to multiplex the plurality of first modulated optical outputs into a first multiplexed optical output provided at the output of the first optical multiplexer, the second optical multiplexer having a plurality of inputs and an output, the second optical multiplexer configured to receive each of the plurality of second amplified optical signals on a corresponding one of the plurality of inputs of the second optical multiplexer, the second optical multiplexer configured to multiplex the plurality of second modulated optical outputs into a second multiplexed optical output provided at the output of the second optical multiplexer.

10. The photonic integrated circuit of claim 9, further comprising a polarization rotator and polarization beam combiner, the polarization rotator coupled to the first multiplexer to receive the first multiplexed optical output and provide a rotated first multiplexed optical output to a first input of the polarization beam combiner, the polarization beam combiner configured to receive the second multiplexed optical output on a second input of the polarization beam combiner, the polarization beam combiner combining the rotated first multiplexed optical output with the second multiplexed optical output into a combined optical output signal provided on an output of the polarization beam combiner.

11. The photonic integrated circuit of claim 9, wherein each of the plurality of modulators comprises a Mach-Zehnder modulator.

12. The photonic integrated circuit of claim 1, wherein each of the laser sources is a DFB laser source or a DBR laser source.

13. The photonic integrated circuit of claim 1, wherein the first optical multiplexer is a first arrayed wavelength grating and the second optical multiplexer is a second arrayed wavelength grating.

14. A photonic integrated circuit comprising:
a substrate;
a first and a second laser source provided on the substrate, the first laser source configured to provide a first optical output at a respective one of a plurality of wavelengths, the second laser source configured to provide a second optical output at a respective one of the plurality of wavelengths;
a first and a second modulator provided on the substrate, the first modulator coupled to the first laser source to receive the first optical output and provide a first of a plurality of first modulated optical outputs and a first of a plurality of second modulated optical outputs, the second modulator coupled to the second laser source to receive the second optical output and provide a second of the plurality of first modulated optical outputs and a second of the plurality of second modulated optical outputs;
a first and a second optical multiplexer provided on the substrate, the first optical multiplexer having a plurality of inputs and an output, the first optical multiplexer configured to receive each of the plurality of first modulated optical outputs on a corresponding one of the plurality of inputs of the first optical multiplexer, the first optical multiplexer configured to multiplex the plurality of first modulated optical outputs into a first multiplexed optical output provided at the output of the first optical multiplexer, the second optical multiplexer having a plurality of inputs and an output, the second optical multiplexer configured to receive each of the plurality of second modulated optical outputs on a corresponding one of the plurality of inputs of the second optical multiplexer, the second optical multiplexer configured to multiplex the plurality of second modulated optical outputs into a second multiplexed optical output provided at the output of the second optical multiplexer; and
a first and a second semiconductor optical amplifier (SOA) provided on the substrate, the first SOA coupled to the first multiplexer to receive the first multiplexed optical output and provide a first amplified optical signal, the second SOA coupled to the second multiplexer to receive the second multiplexed optical output and provide a second amplified optical signal.

15. The photonic integrated circuit of claim 14, further comprising a polarization rotator and polarization beam combiner, the polarization rotator coupled to the first SOA to receive the first amplified optical signal and provide a rotated first multiplexed optical output to a first input of the polarization beam combiner, the polarization beam combiner configured to receive the second amplified optical signal on a second input of the polarization beam combiner, the polarization beam combiner combining the rotated first amplified optical signal with the second amplified optical signal into a combined optical output signal provided on an output of the polarization beam combiner.

16. The photonic integrated circuit of claim 15, wherein each of the plurality of modulators comprises a Mach-Zehnder modulator.

17. The photonic integrated circuit of claim 15, wherein each of the laser sources is a DFB laser source or a DBR laser source.

18. The photonic integrated circuit of claim 15, wherein the first optical multiplexer is a first arrayed wavelength grating and the second optical multiplexer is a second arrayed wavelength grating.

19. A photonic integrated circuit comprising:
a substrate;
a first and a second laser source provided on the substrate, the first laser source configured to provide a first optical output at a respective one of a plurality of wavelengths, the second laser source configured to provide a second optical output at a respective one of the plurality of wavelengths;
a first and a second modulator provided on the substrate, the first modulator coupled to the first laser source to receive the first optical output and provide a first of a plurality of first modulated optical outputs and a first of a plurality of second modulated optical outputs, the second modulator coupled to the second laser source to receive the second optical output and provide a second of the plurality of first modulated optical outputs and a second of the plurality of second modulated optical outputs;
a first and a second optical multiplexer provided on the substrate, the first optical multiplexer having a plurality of inputs and an output, the first optical multiplexer configured to receive each of the plurality of first modulated optical outputs on a corresponding one of the plurality of inputs of the first optical multiplexer, the first optical multiplexer configured to multiplex the plurality of first modulated optical outputs into a first multiplexed optical output provided at the output of the first optical multiplexer, the second optical multiplexer having a plurality of inputs and an output, the second optical multiplexer configured to receive each of the plurality of second modulated optical outputs on a corresponding one of the plurality of inputs of the second optical multiplexer, the second optical multiplexer configured to multiplex the plurality of second modulated optical outputs into a second multiplexed optical output provided at the output of the second optical multiplexer; and
a polarization rotator provided on the substrate, the polarization rotator coupled to the first multiplexer to receive the first multiplexed optical output;
a polarization beam combiner provided on the substrate, the polarization beam combiner having a first input configured to receive a rotated first multiplexed optical output from the polarization beam combiner, and a second input configured to receive the second multiplexed optical output, the polarization beam combiner combining the rotated first multiplexed optical output with the second multiplexed optical output into a combined optical output signal provided on an output of the polarization beam combiner; and
a semiconductor optical amplifier (SOA) provided on the substrate, the SOA having an input configured to receive the combined output signal from the polarization beam combiner and provide an amplified combined output signal on an output of the SOA.

20. The photonic integrated circuit of claim 19, wherein each of the plurality of modulators comprises a Mach-Zehnder modulator.

21. The photonic integrated circuit of claim 19, wherein each of the laser sources is a DFB laser source or a DBR laser source.

22. The photonic integrated circuit of claim 19, wherein the first optical multiplexer is a first arrayed wavelength grating and the second optical multiplexer is a second arrayed wavelength grating.

23. A photonic integrated circuit comprising:
a substrate;
a first and a second laser source provided on the substrate, the first laser source configured to provide a first optical output at a respective one of a plurality of wavelengths, the second laser source configured to provide a second optical output at a respective one of the plurality of wavelengths;
a first and a second semiconductor optical amplifier (SOA) provided on the substrate, the first SOA coupled to the first laser source to receive the first optical signal and provide a first amplified optical signal, the second SOA coupled to the second laser source to receive the second optical output and provide a second optical signal;
a first and a second modulator provided on the substrate, the first modulator coupled to the first SOA to receive the first amplified optical signal and provide a first of a plurality of first modulated optical outputs and a first of a plurality of second modulated optical outputs, the second modulator coupled to the second SOA to receive the second of the plurality of amplified optical signals and provide a second of the plurality of first modulated optical outputs and a second of the plurality of second modulated optical outputs;
a first and a second polarization rotator, the first polarization rotator coupled to the first modulator to receive the first of the plurality of second modulated optical outputs and provide a rotated first of the plurality of second modulated optical outputs, the second polarization rotator coupled to the second modulated to receive the second of the plurality of second modulated optical outputs and provide a rotated second of the plurality of second modulated optical outputs;
a first and a second optical multiplexer provided on the substrate, the first optical multiplexer having a plurality of inputs and an output, the first optical multiplexer configured to receive each of the plurality of rotated first modulated optical outputs on a corresponding one of the plurality of inputs of the first optical multiplexer, the first optical multiplexer configured to multiplex the plurality of rotated first modulated optical outputs into a first multiplexed optical output provided at the output of the first optical multiplexer, the second optical multiplexer having a plurality of inputs and an output, the second optical multiplexer configured to receive each of the plurality of rotated second modulated optical outputs on a corresponding one of the plurality of inputs of the second optical multiplexer, the second optical multiplexer configured to multiplex the plurality of rotated second modulated optical outputs into a second multiplexed optical output provided at the output of the second optical multiplexer.

24. The photonic integrated circuit of claim 23, further comprising a polarization beam combiner having a first and second inputs and an output, the polarization beam combiner coupled to the first multiplexer to receive the first multiplexed optical output on the first input, the polarization beam combiner coupled to the second multiplexer to receive the second multiplexed optical output on the second input, the polarization beam combiner combining the first multiplexed optical output and the second multiplexed optical output into a combined optical output signal provided on an output of the polarization beam combiner.

25. The photonic integrated circuit of claim 23, wherein each of the plurality of modulators comprises a Mach-Zehnder modulator.

26. The photonic integrated circuit of claim 23, wherein each of the laser sources is a DFB laser source or a DBR laser source.

27. The photonic integrated circuit of claim 23, wherein the first optical multiplexer is a first arrayed wavelength grating and the second optical multiplexer is a second arrayed wavelength grating.

28. A photonic integrated circuit comprising:
a substrate;
a first and a second laser source provided on the substrate, the first laser source configured to provide a first optical output at a respective one of a plurality of wavelengths, the second laser source configured to provide a second optical output at a respective one of the plurality of wavelengths;
a first and a second semiconductor optical amplifier (SOA) provided on the substrate, the first SOA coupled to the first laser source to receive the first optical signal and provide a first amplified optical signal, the second SOA coupled to the second laser source to receive the second optical output and provide a second optical signal;
a first and a second modulator provided on the substrate, the first modulator coupled to the first SOA to receive the first amplified optical signal and provide a first of a plurality of first modulated optical outputs and a second of the plurality of first modulated optical outputs, the second modulator coupled to the second SOA to receive the second of the plurality of amplified optical signals and provide a second of a plurality of second modulated optical outputs and a second of the plurality of second modulated optical outputs;
a first and a second polarization rotator, the first polarization rotator coupled to the first modulator to receive the first of the plurality of second modulated optical outputs and provide a rotated first of the plurality of second modulated optical outputs, the second polarization rotator coupled to the second modulator to receive the second of the plurality of second modulated optical outputs and provide a rotated second of the plurality of second modulated optical outputs,
a first and a second polarization beam combiner provided on the substrate, the first polarization beam combiner configured to receive the first of the plurality of first modulated optical outputs on a first input, and the rotated first of the plurality of second modulated optical outputs on a second input, the first polarization beam combiner providing a first combined output, the second polarization beam combiner configured to receive the second of the plurality of first modulated optical outputs on a first input, and the rotated second of the plurality of second modulated optical outputs on a second input, the first polarization beam combiner providing a second combined output; and
an optical multiplexer provided on the substrate, the optical multiplexer having a plurality of inputs and an output, the optical multiplexer configured to receive each of the first and second combined outputs on a corresponding one of the plurality of inputs of the optical multiplexer, the optical multiplexer configured to multiplex the first and second combined outputs into a multiplexed optical output provided at the output of the first optical multiplexer.

29. The photonic integrated circuit of claim 28, wherein each of the plurality of modulators comprises a Mach-Zehnder modulator.

30. The photonic integrated circuit of claim 28, wherein each of the laser sources is a DFB laser source or a DBR laser source.

31. The photonic integrated circuit of claim 28, wherein the optical multiplexer is an arrayed wavelength grating.

32. A photonic integrated circuit comprising:
a substrate;
a laser source provided on the substrate, the laser source configured to provide an optical output at a respective one of a plurality of wavelengths;
a semiconductor optical amplifier (SOA) provided on the substrate, the SOA coupled to the laser source to receive the optical output and provide an amplified optical output;
a modulator provided on the substrate, the modulator having an input and a first and a second output, the input of the modulator configured to receive the amplified optical output, in response to the amplified optical output the modulator provides a first modulated output on the first output and a second modulated output on the second modulated output;
a first optical multiplexer provided on the substrate, the first optical multiplexer having a plurality of inputs and an output, the first optical multiplexer configured to receive the first modulated output on a first of the plurality of inputs and provide a first multiplexed output at the output of the first optical multiplexer;
a second optical multiplexer provided on the substrate, the second optical multiplexer having a plurality of inputs and an output, the second optical multiplexer configured to receive the second modulated output on a first of the plurality of inputs and provide a second multiplexed output at the output of the second optical multiplexer.

33. The photonic integrated circuit of claim 32, further including a polarization rotator and a polarization beam combiner, the polarization rotator configured to receive the first multiplexed output from the first optical multiplexer and provide a rotated first multiplexed output to a first input of the polarization beam combiner, the second multiplexed output from the second optical multiplexer provided to a second input of the polarization beam combiner, the polarization beam combiner combining the rotated first multiplexed output and the second multiplexed output into a combined output provided at an output of the photonic integrated circuit.

34. A transmitter, comprising:
a photonic integrated circuit as claimed in claim 6; and
a circuit having an input and a plurality of outputs, the photodiode configured to provide an electrical signal to the circuit on the input, the electrical signal representative of one or more characteristics related to the received third optical output, a first of the plurality of outputs being coupled to the first laser source, the circuit configured to provide a bias voltage to the first laser source on the first of the plurality of outputs in response to the electrical signal provided by the photodiode.

35. The transmitter of claim 34, a second of the plurality of outputs of the circuit being coupled to the first semiconductor optical amplifier (SOA), the circuit configured to provide a bias voltage to the first SOA on the second of the plurality of outputs in response to the electrical signal provided by the photodiode.

36. The transmitter of claim 34, wherein the plurality of characteristics includes a wavelength and an optical power.

* * * * *